United States Patent [19]

Casden

[11] 4,408,122
[45] Oct. 4, 1983

[54] KEY CARD AND METHOD OF MANUFACTURING SAME

[75] Inventor: Martin S. Casden, Calabasas, Calif.

[73] Assignee: Soundcraft, Inc., Woodland Hills, Calif.

[21] Appl. No.: 225,144

[22] Filed: Jan. 14, 1981

Related U.S. Application Data

[63] Continuation-in-part of Ser. No. 119,502, Feb. 7, 1980, abandoned.

[51] Int. Cl.³ .............................................. G06K 7/08
[52] U.S. Cl. .................................. 235/449; 235/493; 365/133
[58] Field of Search ............... 235/449, 493, 450, 490, 235/492, 487; 365/133, 195; 360/2

[56] References Cited

U.S. PATENT DOCUMENTS

| | | | |
|---|---|---|---|
| 3,774,179 | 11/1973 | Wiegand et al. | 340/174 ZB |
| 3,808,404 | 4/1974 | Riggs | 235/61.12 M |
| 4,109,317 | 8/1978 | Henkler et al. | 365/133 |

*Primary Examiner*—G. Z. Rubinson
*Assistant Examiner*—Robert G. Lev

*Attorney, Agent, or Firm*—Beehler, Pavitt, Siegemund, Jagger & Martella

[57] ABSTRACT

A programmable data storage element includes a self-nucleating bi-stable magnetizable wire and a body of permanently magnetizable material such as barium ferrite. The bi-stable magnetic wire is normally readable in a magnetic reader constructed to cause state reversal of the magnetic wire to induce an output pulse in a sensing coil. The body of permanently magnetizable material can be selectively magnetized in the vicinity of the bi-stable magnetic wire to inhibit reading of the wire in the reader. A given wire can thus be programmed to store a binary bit of data by being selectively enabled or disabled for reading in a suitable magnetic reader. An improved passcard may be constructed by including an insert of barium ferrite in a passcard on which are disposed a plurality of bi-stable magnetic wires in a predetermined pattern. The passcard may be encoded with an identification number or other information at any time subsequent to manufacture by magnetizing selected portions of the barium ferrite insert. The encoded information may be altered thereafter by demagnetizing previously magnetized portions of the barium ferrite and magnetizing previously unmagnetized portions thereof. An interactive security system is possible with the programmable storage element of this invention.

23 Claims, 12 Drawing Figures

KEY CARD AND METHOD OF MANUFACTURING SAME

This application is a continuation-in-part of application Ser. No. 119,502, filed Feb. 7, 1980, and now abandoned.

BACKGROUND OF THE INVENTION

1. The Prior Art

In U.S. Pat. No. 3,783,249, granted Jan. 1, 1974, there is disclosed a coded pulse generation system which includes a coded card and code reader. The card is provided with a plurality of axially straight helically twisted magnetic wires disposed parallel to each other and extending transversely of the card. Each of the wires is treated to form a shell and a central core, with the shell having the capacity to be permanently magnetized in an axial direction and having high coercivity. The core, by contrast, has relatively low coercivity. Both the shell and the core are magnetically anisotropic, with an easy axis of magnetization parallel to the axis of the wire. The wire is magnetized by subjecting it to an external magnetic field. Since the relatively hard shell has a retentativity and coercivity greater than that of the relatively soft core, when the external magnetic field employed to magnetize the wire is removed, the shell retains its magnetization and couples or captures the core by magnetizing it in an axial direction opposite to the direction of magnetization of the shell. Thereby, the core forms a magnetic return path or shunt for the shell, and a domain wall interface between the core and the shell.

According to the disclosure of the aforesaid patent, when each of the wires is subjected to an external magnetic field of greater magnitude than the field of the shell, and having a polarity opposite to that of the shell, such as by bringing a permanent magnet into close proximity to the wire, as the external field increases to a certain point, it overcomes the coercivity of the wire shell over the core, thereby capturing the core from the shell by abruptly reversing the flux direction of the core through the process of nucleation of a magnetic domain. Conversely, when such external magnetic field is removed from the vicinity of the wire, the reversal of the field direction of the core results in an abrupt change in the magnetic flux surrounding the wire. If a coil is placed adjacent to the wire, as the permanent magnet is thus brought into close proximity to, and removed from, the vicinity of the wire, it will be found that current pulses are induced in the coil by abrupt changes in the magnetic field. The said patent further teaches the utilization of this magnetically inducted effect in a coded passcard system. The manner in which bi-stable ferro-magnetic wire may be provided, is the subject of a further U.S. Pat. No. 3,820,090, issued June 25, 1974, on an application of the same inventor.

Among the ways in which the magnetic and inductive principle so described in U.S. Pat. No. 3,783,249 has been utilized, is in the construction of pass cards and card readers of the type disclosed in the last said patent. By predisposing the magnetized wires in certain patterns on or within the passcards, the cards may be, in effect, coded to produce different pulse responses when the cards are passed into or through a slot having permanent magnets and pick-up coils provided in the area through which the wire patterns of the cards may be passed adjacent the permanent magnets. By varying the patterns of the magnetized wires in a series of cards, each card may be made to identify a particular individual to whom it may be issued, and may be employed to pass such individual through one or more pre-selected barriers having readers responsive to the particular pulse arrangement generated by passing that particular card through or into the reader. Such cards may also be utilized for other identification purposes, such as operating a time-clock for each particular individual, for payroll purposes or otherwise in a system to account for the presence or absence of each individual holding a distinctive card.

The principal problem in utilizing the card and reader system disclosed in said U.S. Pat. No. 3,783,249, has been the practical one of fabricating such cards both from a cost standpoint and from the standpoint of insuring the operability of each card of a particular sequence of fabricated cards. Because the magnetized wires are small, considerable care must be exercised in disposing them upon, and securing them to, either the passcard itself, or to a small carrier sheet to be placed in or on such passcard. In practice, it appears that the more popular method of fabricating passcards of this type has involved placing the wires on or between small thin plastic sheets which are then inserted into a recess provided in the plastic passcard, or which sheets may be sandwiched between laminations of such passcard, or even simply placed upon the face of such passcard.

In order to increase the pattern variants for the wires, one of the techniques utilized heretofore has been to punch out portions of the sheet on which the wires have been laid and secured. Where this done, however, it becomes most critical for the insert to be properly disposed within or upon the pass-card. This is because in those security systems where each card is provided with a different coding to designate a different individual, it is necessary that the pulse pattern which is created by the insertion of each card into the reader, be exactly that needed to trigger the appropriate security system response.

Heretofore, where cards constructed in accordance with said U.S. Pat. No. 3,783,249 have been made either by providing different lengths of wires or different dispositions of the wires upon a sheet backing, which is then inserted in or otherwise applied to the pass-card, any mishandling of the small sheet after the wires have been secured to it, such as inserting the sheet upside down, renders it most difficult to detect, and may require review of an entire sequence cards numbering as much as thousands. Similarly, if it should be found that one of the wires placed on the backing sheet has been inadequately magnetized, the same problem of detection may be encountered. Additionally, where uniform lengths of wires are placed on the backing sheet and segments of the wire with the backing sheet are punched out, the same error in assembly may occur, with the consequent problem of having to ascertain from the entire sequence of cards, which one is defective. Where defective cards are located, unless a new card is individually made, a blank must then be recorded in the card sequence. All of these problems have tended to render the manufacture of pass-cards utilizing the principle disclosed in U.S. Pat. No. 3,783,249 quite costly, thereby limiting their use to very special security systems where such high cost can be justified from a business or other standpoint.

As used in the prior art, a magnetic wire could not be programmed after insertion in a passcard and the card was encoded by variation in physical placement of the wire on the passcard relative to the anticipated position of the magentic read head. Each magnetic wire on a passcard, however, was indistinguishable from any other wire on a passcard except for their relative positioning.

The encoding of such cards was permanent once the card was assembled. In one method, taught in U.S. Pat. No. 4,187,981, issued Feb. 12, 1980 to Siuko et al., the card was encoded by punching holes through the card to cut the wires into unequal segments disposed in a predetermined pattern. This form of encoding is also permanent and unalterable.

It is known in the prior art to provide magnetizable portions in a passcard, which portions may be alternately magnetized or demagnetized by a read head for storing and erasing information. This result is achieved by magnetizing a metallic portion of the card and using this magnetic field to cause movement of a lock element in the read head. Bi-stable magnetic wires are not used in such passcards. However, the read heads used in such a system are of fundamentally different operation from those necessary to read passcards using bi-stable magnetic wires. Thus, one known type of read head of the prior art uses tumblers which are operated by the coded magnetized portions of a passcard to clear a path for insertion of the card to activate a microswitch.

The read heads for decoding bi-stable magnetic wire patterns have no moving parts and operate by electronically decoding a series of pulses derived by passing the card through an external magnetic field in the read head. Heretofore, it has not been possible to alter the information encoded on a passcard using bi-stable magnetic wires as the encoding medium.

The readers of the type just described are currently in use and except as modified by the addition of magnetic coils to take advantage of the programmable data storage of of this invention, the readers are known in the art.

SUMMARY OF THE INVENTION

The present invention eliminates the problems arising in the course of manufacturing passcards constructed in accordance with U.S. Pat. No. 3,783,239, by providing magnetizable wires each having a common length and disposed with the other wires in a standard pattern, with the wires being placed upon a thin backing sheet of barium ferrite. The sheer of barium ferrite, with the wires thus mounted, is first placed upon the passcard and secured thereto, and only after this is done, is the barium ferrite sheet or portions thereof, subjected to spot magnetizations in accordance with a different predetermined pattern for each card. When such spot magnetizations of the barium ferrite sheet are accomplished, the segment or segments of each of the magnetized wires falling within the ambit of a spot magnetization will have its magnetization either nullified or its polarity reversed—provided, of course, that the strength of the spot magnetization is sufficient to overcome wire magnetization within at least a portion of each magnetized spot of barium ferrite. Thereby, varied patterns of magnetized wires may be created in the cards themselves, after they have been completely fabricated. By this method of construction, no error can occur through the inadvertent transposition of the carrier sheet as it is applied to the passcard, as can happen in the practice of the invention of aid patent through prior art techniques. In addition to eliminating, or materially reducing the chances of error in the fabrication of the cards, it will be found that the present invention also substantially reduces the cost of fabricating the cards, so that security systems in accordance with the patent may also be more widely used from an economic standpoint.

The technique of the present invention may also have many other applications than the fabrication of passcards, as, for example, in any type device which may utilize the principle upon which the invention of said U.S. Pat. No. 3,783,249 is predicated.

The addition of a permanently magnetizable body in proximity to the bi-stable magnetic wire produces a programmable memory or data storage element. That is, any one magnetic wire on a passcard or other carrier of bi-stable magnetic wires may be made to assume one of two conditions: an active condition in which the magnetic wire functions normally in that its state may be reversed by an externally applied magnetic field to derive an output pulse in a pickup coil; and an inhibited or disabled condition in which the magnetic field of the adjacent permanently-magnetized material inhibits the normal operation of the magnetic wire so that no output pulse is obtained by the pick-up coil. Each wire on the card may be used in this manner to store a binary bit of data, by selectively magnetizing or demagnetizing the appropriate area of the permanently magnetizable material to alter the condition of any one magnetic wire accordingly. A given area of the magnetizable material may be alternately magnetized and demagnetized by applying a properly oriented magnetic field of appropriate magnitude. This magnetic field may be of only very short duration, such as may be obtained by discharging a charged capacitor through a coil winding. The permanently magnetizable material may be in the form of discrete elements, each dedicated to an individual magnetic wire, or may be a sheet of magnetizable material such as a sheet of barium ferrite powder in a rubber base on which are disposed the magnetic wires.

It has been found that the normal operation of a magnetic wire can be inhibited by magnetizing an area or spot of the magnetizable material which is smaller in diameter than the length of the magnetic wire.

The reasons for the inhibition of the normal behavior of the magnetic wire are not fully understood. It is believed that the adjacent magnetized spot either interferes with the initial magnetization of the shell and core of the wire or that it interferes with the external magnetic field required to induce a change of state in the magnetic wire. It may also be that a combination of these two effects takes place to yield the results obtained by this invention.

In some cases it may not be possible to disable only a portion of a given wire leaving the remainder of the wire enabled for reading in a read head. This may be due to the short length of the wire, to the wire material, or other factors. Certain pick-up coil designs also may not be capable of sensing a differential between a disabled portion of the wire and an enabled segment thereof.

In the event that it is not possible to disable only a segment of a bi-stable wire so as to leave a remaining portion in an active, readable state, an alternate embodiment is disclosed where discrete wires are matched in binary pairs, each discrete wire in a pair being readable by one of two pick-up coils mounted in a magnetic read head. One or the other wire in a matched pair is fully disabled by magnetizing an appropriate area of an adjacent permanently magnetizable body. The remaining wire is left in a fully active condition and is read by the corresponding pick-up coil to produce an "0" or an "1" output pulse depending on which pick-up coil derives the output by reading the active wire. Preferably, the matched wire pairs are disposed to form two parallel rows of wires, each wire in one row being matched with an aligned wire in the other row.

In a third embodiment, one row of parallel wires serves to produce a clock output in one of the pick-up coils. The other row of wires can be encoded by disabling selected wires. The read head decodes the keycard by comparing the clock output of one pick-up coil with the code output of the other pick-up coil: a clock pulse matched to a corresponding code pulse being indicative of one binary state; a clock pulse without a corresponding code pulse being obtained being indicative of a second binary state.

From the foregoing, it will be appreciated that a passcard may include one or more magnetic wires for programmable storage of data, in addition to the identity coding wires, if any, carried by the passcard.

Such programmable data storage is a very useful feature, as will be described below in specific applications, and has not been possible heretofore in passcards and card reader systems of the magnetic wire type.

The programmable storage element of the present disclosure is readable in conventional magnetic readers of the type presently in use for reading passcards and keycards of the type using bi-stable magnetic wires. Thus, except as modified hereinafter for writing data on a card, the readers are known devices presently in use.

Magnetic coils may be provided in an otherwise conventional read head for addressing selected storage elements or wires on the passcard, that is, for enabling or inhibiting specific magnetic wires thereon. Such a system is interactive in that it is possible to both read existing information from a passcard into a read head and also to add new information or modify the existing data on the passcard. The modified magnetic read head may also include or be in communication with electronic circuitry for storing or processing the data on the card and for reprogramming the data storage elements in the passcard.

BRIEF DESCRIPTION OF THE DRAWINGS

In the accompanying drawings.

DESCRIPTION OF THE PREFERRED EMBODIMENT

Figures 1, 2, 3, 4, 5, 5A, 6:
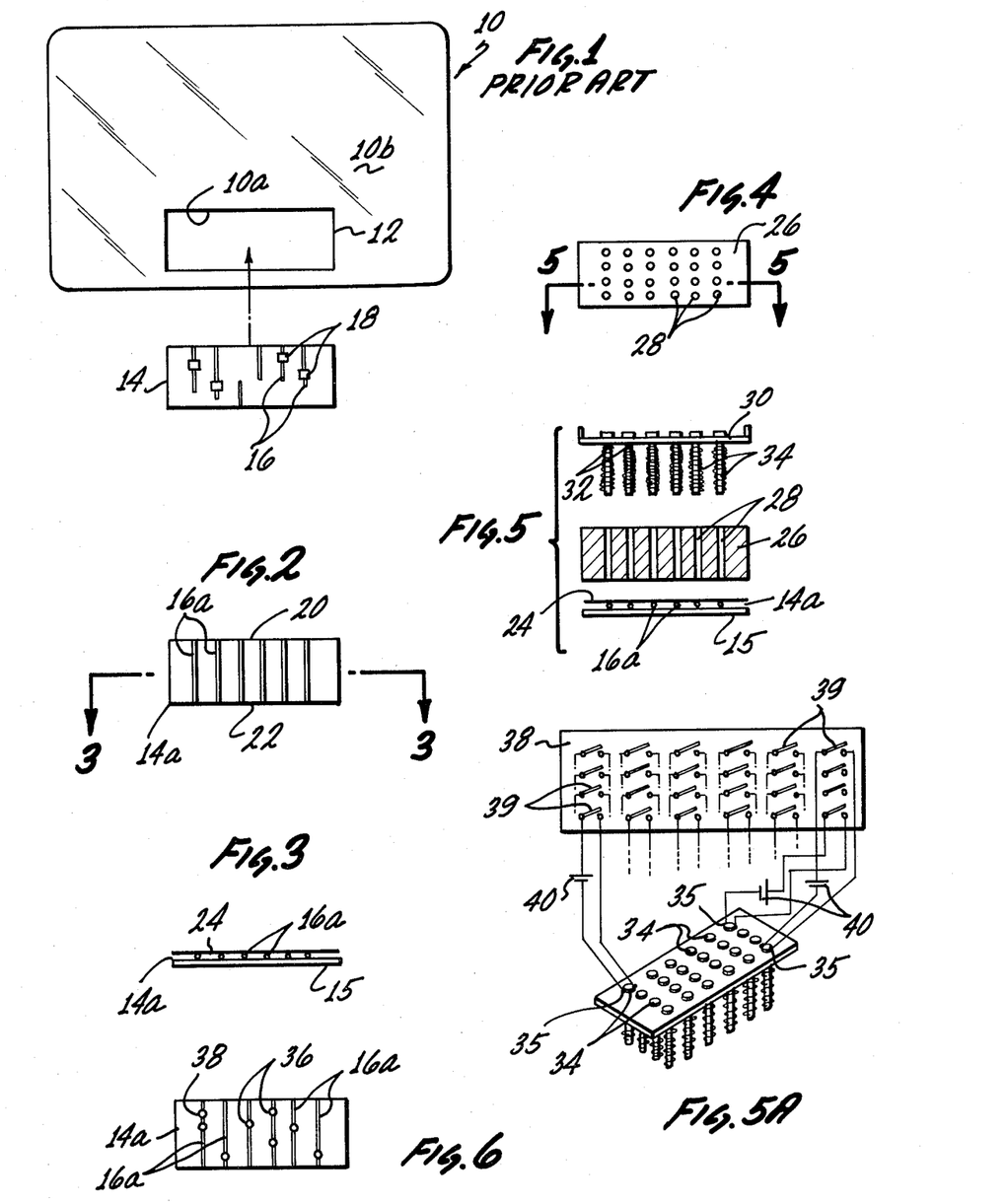
FIG. 1 discloses an exploded plan view of a passcard showing how the magnetic wire insert may be applied to the card, in accordance with prior art technique.
FIG. 2 is a plan view of an insert constructed in accordance with the present invention.
FIG. 3 is a section taken on line 3—3 of FIG. 2.
FIG. 4 is a plan view of a magnetizer block.
FIG. 5 includes a section taken on the line 5—5 of FIG. 4, together with a section of a magnetizing coil tray, and disclosing how a preselected pattern of magnetizing coils may be dropped into the magnet support to be brought into close proximity with the insert of FIG. 3.
FIG. 5A is a perspective view of the magnet tray illustrating a portion of switching circuits for the coils 34.
FIG. 6 is a plan view similar to FIG. 2 showing the disposition of the magnetic areas after spot magnetization has been effected in the manner illustrated in FIGS. 5 and 5A.

According to manufacturing techniques heretofore practiced in producing passcards for use in systems utilizing the principle of U.S. Pat. No. 3,783,249, there is provided a passcard backing 10, which may be constructed of a plurality of laminations, such as a bottom sheet 10a and a windowed sheet 10b. The window 12 in sheet 10b may be oblong and configured to receive a thin backing sheet 14 upon which are disposed a plurality of magnetized wires 16. The latter may be either of different lengths and disposed differently on the sheet 14 in the manner illustrated, or they may be of either different or the same lengths and punched at predetermined locations 18 to eliminate either all or any portion of the magnetized wires 16 so disposed and secured to the sheet 14. The oblong insert 14 may be seated in the window 12 and secured to the backing sheet 10a by an adhesive, or the entire face of the windowed lamination 10b with the insert 14 so seated in the window 12 may be covered with a further sheet of plastic (not shown), and the three laminations may then be secured together either by adhesive or the application of heat.

This has been the principal manner in which cards have been made for systems utilizing the principle disclosed in U.S. Pat. No. 3,783,249, despite a somewhat different construction illustrated in FIGS. 1 through 4 of that patent. It is this preferred technique which results in the various problems heretofore described.

In order to obviate the problems which have arisen through the practice of the prior art techniques in the fabrication of passcards for use in such systems, as shown in FIGS. 2 and 3, the insert 14a may be simply provided with the same number of wires 16a, but each of such wires is preferably made to extend from one edge 20 to the other edge 22 of the insert sheet 14a, and the insert sheet 14a may either be itself made of barium ferrite, or a sheet 15 of barium ferrite may be provided as a separate backing sheet. In one form, the insert 14a may be provided with a plastic cover 24 to protect the wires 16 after they have been secured to the underlying sheet 15 of barium ferrite. Such a cover sheet 24 may, however, be found to be unnecessary since the wires 16 may be covered after the insert 14a has been placed in the window 12 on the card 10, and a plastic cover sheet (not shown) is laid over the windowed lamination 10b and secured thereto.

The present invention may be employed to reverse the polarity of magnetization of selected segments of the wires 16a. Thus, after the magnetized wires 16a have been disposed upon the barium ferrite sheet 15 by the method of the present invention predetermined segments of the several wires 16a may have applied thereto, through the barium ferrite backing sheet 15, an overcoming magnetic flux. The effect of this is to change the respective polarities of both the soft core of the affected segments of the wire 16a and its capturing shell portion of greater coercivity. The manner in which this magnetization may be accomplished is illustrated in FIGS. 4, 5, 5A and 6.

A magnet support block 26, preferably of a dielectric material, is provided with a plurality of parallel orifices 28 extending through the block 26, with the orifices 28 being co-aligned in such a manner that when the block 26 is placed over the insert 14a on which the wires 16a are disposed and secured, the rows of orifices 28 will register with the wires 16a. An electromagnet tray 30 having orifices 32, corresponding both in number and disposition with the orifices 28 and the block 26, may be provided with a preselected number of electro magnet 34 disposed in predetermined orifices 32. This electromagnet tray 30 is brought above the block 26, which, itself, is placed over the laminated insert 14a. The electromagnets 34 are then lowered and passed through the orifices 28 until the magnets 34 are brought into close proximity with the barrium ferrite sheet 15 of the insert 14a. When current is applied to the coil of each of the electromagnets 34 a magnetic field is created, the effect of which is to magnetize the barium ferrite sheet 15 in each of the areas thus abutted by an end of an electromagnet 34. Thereby, as shown in FIG. 6, a plurality of selected areas 36 of the barium ferrite sheet 15 will be magnetized sufficiently to overcome the magnetization of the wires 16a. Since the barium ferrite has the characteristic of good magnetic flux retentivity and coercivity, the insert 14a will thereby be provided with a plurality of wires 16a having those segments 38 falling within the areas 36 of magnetization, effectively demagnetized, or at least with magnetization polarization opposite or otherwise different from that of the remainder of each of the wires 16a.

Alternatively, instead of moving individual electromagnets 34 in and out of the support block 26 to provide different spot magnetization patterns 36 on the barium ferrite sheet 15, it would be preferrable to provide an electromagnet 34 in each of the orifices 28 in the support block 26, and further provide, as shown in FIG. 5A, a switching panel 37 having switches 39 whereby current from sources 40 may be passed to and through the coils 35 of preselected electromagnets 34 of those inserted in all of the orifices 28 of the block 26, thereby to produce magnetic flux about the ends of each of said preselected coils 35. The ability thus to simply switch current in order to energize the coil or coils 35 of any selection of electromagnets 34 in the block 28, would obviously accelerate production of the passcards 10, particularly if computerized.

It may be seen from the foregoing description that the present invention provides a simplified method of varying the magnetic patterns of wires provided on a passcard of the type disclosed in the aforementioned patent, but most importantly, provides a fool-proof technique for the fabrication and assembly of the components for such cards. By eliminating potential errors in the assembly of cards, their cost of fabrication may be greatly reduced.

While the present invention is described and illustrated in reference to the manufacture of pass cards, it could have many other applications, such as for producing bars, keys or other devices which may be made in whole or in part from barium ferrite or other magnetizable material, but utilize the principle taught in said U.S. Pat. No. 3,783,249.

The magnetic wires used in the cards of the present invention are elements which are stimulated by an external magnetic field in a reader device to obtain an output signal. The addition of a magnetizable body in proximity to the magnetic wire, as in the card itself, introduces the possibility of disabling a given wire or a segment thereof as a readable element in the system by inhibiting the normal behavior of the wire. The resulting enabled or disabled condition of a given wire can be indicative of two alternative binary logic states. Each wire is thus capable of storing a bit of binary data.

All references herein to magnetic or magnetizable wires, or to bi-stable magnetic wires are intended to refer to self-nucleating wires such as are disclosed in U.S. Pat. Nos. 3,820,090 and 3,783,249. Briefly, wires of magnetizable material are treated to form a soft core of low magnetic coercivity and a hard shell of high magnetic coercivity, such that when the wire is magnetized the soft core forms a return path for the magnetic field of the shell. The core is thus magnetized in a direction opposite to the shell. Under the influence of an external magnetic field of sufficient strength and direction equal to that of the shell the influence of the magnetic field of the shell on the core is overcome by the external magnetic field such that the magnetization of the core is reversed into alignment with the stronger external magnetic field. The core can thus no longer serve as a return path for the magnetic field of the shell portion, such that the magnetic field of the shell is forced to complete itself externally of the wire, that is, the return path of the magnetic field of the shell flips from the interior core of the wire to a magnetic field external to the wire and running from one end thereof to the opposite end. If a pickup coil is placed in the vicinity of the wire this sudden switch of the magnetic field of the shell from the internal core to the exterior of the wire induces a sharp pulse in the coil. A pulse output can thus be derived by causing such switching or state reversal of bi-stable magnetic wires in a magnetic reader device.

If the magnetic wire is now removed from the influence of the external magnetic field, the shell portion of higher coercivity will again cause the core of lower coercivity to be magnetized in the opposite direction such that the magnetic field of the shell is again completed within the core. As a result, the external magnetic field of the shell collapses. The wires thus revert to their original state in which they were prior to insertion into the magnetic reader. This collapse is also capable of producing a pulsed output.

Conventional magnetic readers used for reading or decoding this type of encoded card typically include a magnet which is placed ahead of the pick-up coil for initially magnetizing all the wires in the card in a given direction. This is a precautionary measure in case the wires were not sufficiently magnetized prior to insertion into the reader. It will be noted, therefore, that the wires do not necessarily have to be magnetized prior to insertion into a reader equipped with an initial magnetizing means, which magnetizing means is separate from the magnetic field subsequently used to cause reversal of the magnetic field of the cores.

Figure 7A:
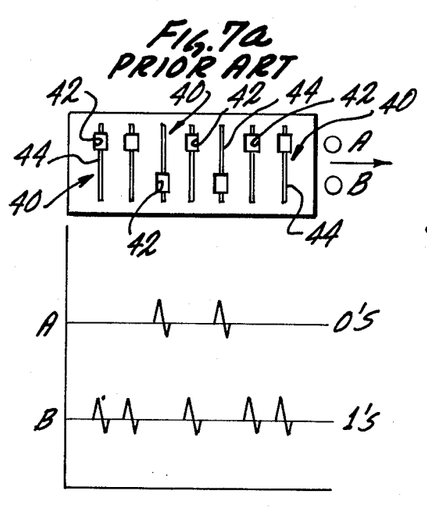
FIG. 7A shows a wire carrier encoded by the method of the prior art; the pulse output of the read heads A and B is shown underneath.

FIG. 7A of the drawings shows the prior art method of encoding where portions of wires 40 were punched out by punch holes 42 so that a longer segment 44 of the wire 42 was left. Depending on the placement of the punch hole 42 the remaining wire length 44 could be read by one of two pick-up coils A or B mounted in a magnetic reader. The pulse output derived by the pick-up coils A and B is shown in the lower part of FIG. 7A. As shown there, depending on the location of the remaining wire segment 44, a pulse is derived by one or the other pick-up coil to obtain a binary-type decoded sequence. This sequence is then available for processing by other circuits for operating an access gate or other devices.

Figure 7B:
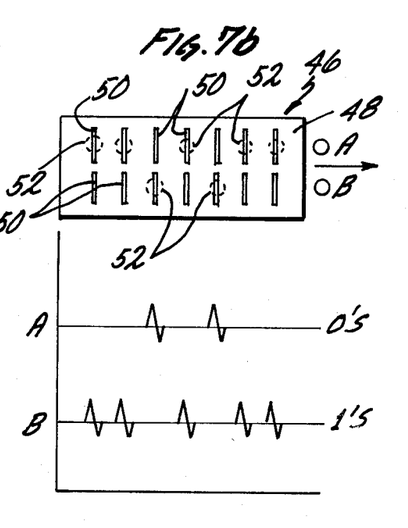
FIG. 7B shows a wire carrier encoded with the technique of the present invention to obtain the same read head pulse output as in FIG. 7A.

FIG. 7B of the drawings shows a card encoded by the method of the present invention. A card carrier 46 which includes an underlying sheet of a permanently-magnetizable material such as barium ferrite carries thereon two rows of parallel wires 50. The same coding of FIG. 7A is programmed onto the carrier 46 of FIG. 7B by spot magnetization of selected areas of the barium ferrite sheet 48. Thus the punched holes are replaced by areas of magnetization 52, which have the effect, as has been described, of inhibiting the reading of the affected wires 50. As the carrier 46 is passed under the pick-up coils A and B the inhibited wires produce no output in their respective pick-up coils, resulting in the pulse output shown in the lower part of FIG. 7B for the respective pick-up coils. It will be noted that this pulse output is equivalent to that obtained in FIG. 7A by the techniques of the prior art.

Figure 7C:
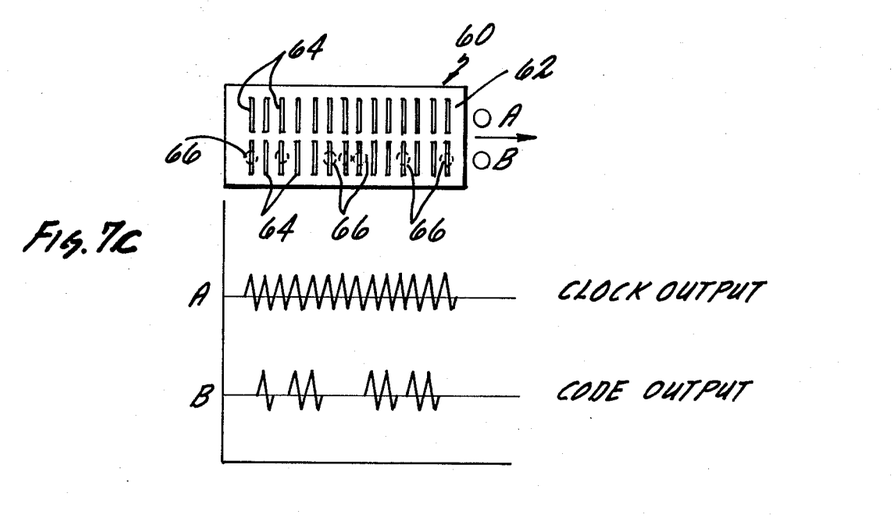
FIG. 7C shows an alternate method of deriving a code pulse output by the technique of the present invention.

FIG. 7C shows an alternate embodiment making use of the techniques of the present invention. A carrier 60 including a sheet of magnetizable material such as barium ferrite 62 has disposed thereon two parallel rows of parallel wires 64. One of the wire rows, the upper row in the drawing, is left fully enabled such that when the carrier 60 is passed under the pick-up coils A and B an output pulse is derived from each of the wires 64 in the upper row. This output of pick-up coil A is shown in the lower part of FIG. 7C as the clock output. The remaining row of wires is subject to encoding by the magnetizing techniques of the present invention to obtain a code output from the pickup coil B, this code output also being shown in the lower portion of the FIG. 7C. The wires on carrier 60 are matched into pairs, the aligned wires in the parallel rows constituting matched pairs. Thus, each clock pulse obtained from pick-up coil A is compared to the output of pick-up coil B to test whether a code pulse has been obtained corresponding to that clock pulse. If such a corresponding code pulse is present, then a first binary condition is said to exist. If no corresponding code output is obtained for a given clock pulse, then a second binary state is deemed to exist. In this manner, a binary-type output is obtained from the coded carrier 60. Again, the coding of the lower row of wires is accomplished by magnetizing areas of the magnetizable body 62 at selected areas 66 to inhibit reading of certain of the wires to obtain a desired code pulse output.

A common security problem encountered in card-operated entry systems is the "passback" of cards by one person to another after the first person has operated the entry control device and effected entry.

Figure 8:
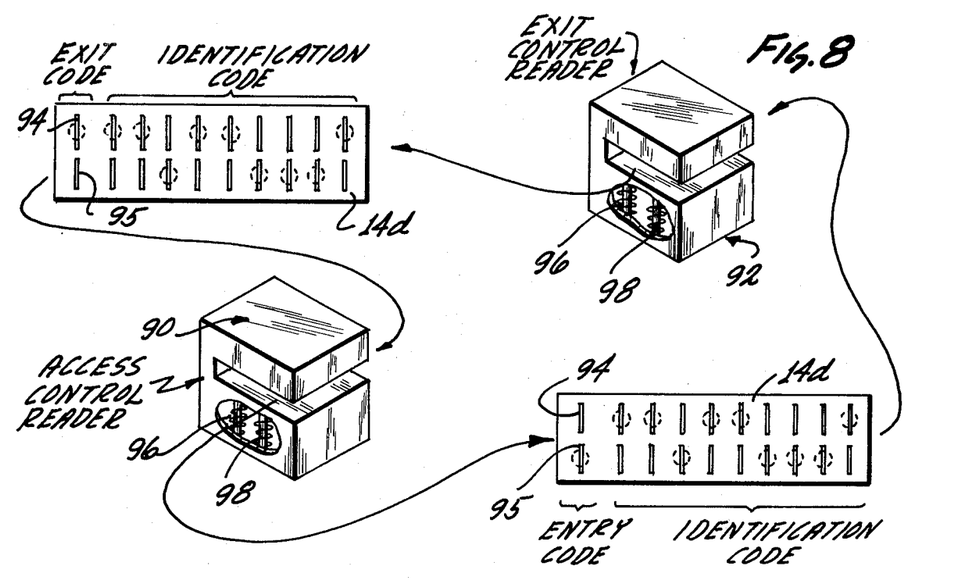
FIG. 8 illustrates an anti-passback system implemented by the technique of the present invention.

As shown in FIG. 8, this problem is solved with the programmable storage elements of the present invention by incorporating magnetizing coils 96 and 98 in the entry control read head 90 for storing an entry code on a selected wire element 94 in the carrier 14d. If passback is attempted the read head 90 will detect this entry code and will refuse entry.

The entry code is replaced by an exit code stored on the carrier 14d by an exit control device 92. In this system one specific wire 94 is dedicated for activation to indicate an entry code, and a second specific wire 95 is activated at the time of exit to indicate an exit code while the first wire 94 is simultaneously deactivated. The entry control read head 90 may be programmed to allow entry only if the exit code is detected, thereby frustrating simple passback of the card without first going through the exit control device 92. Alternatively, the entry code may consist simply of the activation or deactivation of a single preselected magnetized wire on the passcard. Access may be allowed or denied depending on the condition of the selected wire as detected by the entry reader. Many different code formats are possible without detracting from the scope of the invention.

Figure 9:
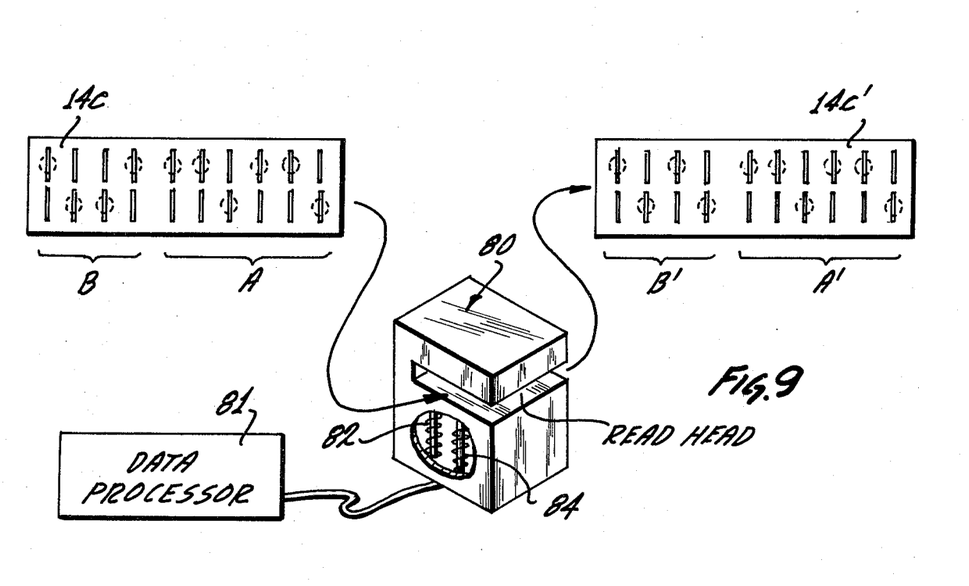
FIG. 9 shows an interactive security system where present data is decoded from a card by a read head and the decoded data is replaced by new data programmed thereon by the read head.

Another specific application of the present invention involves storing a numerical count or total on the card. For example, a specific passcard may be issued for a given number of authorized entries or activations of a certain device. This given number could be initially stored in binary form on the card, decoded upon insertion of the card in a reader, the decoded number then being decremented by one unit and reencoded onto the card by logic controlled magnetic coils in the reader unit. The entry control reader is provided with logic circuits for detecting a zero total on the card at which point further use of the card is rejected by the reader. One such possible application is shown in FIG. 9, where a wire carrier 14c includes a number of wires A which are encoded with an identification code, and a second group of wires B which is available for storing variable data, such as a number of allowed access operations. The carrier 14c is inserted in the read head 80 wherein the encoded wire sequence A is read and identified and the encoded number B is read, decremented by one or otherwise altered by the data processor 81 and the new number B' encoded as in carrier 14c' by magnetic coils 82 and 84 provided in the read head 80.

Similarly, any desired data, numerical or otherwise, may be programmed, stored and erased on a passcard made according to the present disclosure.

What is claimed is:

1. The method of fabricating a passcard comprising:
   (a) providing a relatively rigid backing lamination and a carrier sheet secured thereto, said carrier sheet having a plurality of bi-stable magnetic wires disposed thereon in a predetermined pattern, and at least a part of said carrier sheet being of barium ferrite or other similarly magnetizable material and extending over an area adjacent at least some of said wires; and
   (b) subjecting said magnetizable material at at least one preselected location in said area adjacent at least one of said wires, to a magnetic force to magnetize the barium ferrite in said preselected location with a different polarity from that of the magnetization of the wires.

2. The method of fabricating a passcard comprising:
   (a) providing a carrier sheet, said carrier sheet having a plurality of bi-stable magnetic wires disposed thereon in a predetermined pattern, and at least a part of said carrier sheet being of barium ferrite or other similarly magnetizable material and extending over an area adjacent at least some of said wires; and
   (b) subjecting said magnetizable material at at least one preselected location in said area adjacent at least one of said wires, to a magnetic force to magnetize said magnetizable material in said preselected location with a different polarity from that of the magnetization of the wires.

3. A passcard having a plurality of bi-stable magnetic wires disposed thereon in a predetermined pattern, for insertion in a magnetic reader to produce a predetermined signal pattern, said passcard being comprised at least in part of a sheet of barrium ferrite or other similarly magnetizable material, said bi-stable magnetic wires being disposed in a predetermined pattern upon and secured to, said magnetizable material and said magnetizable material being magnetized at a plurality of preselected areas adjacent said bi-stable magnetic wires to overcome and change the polarity of magnetization of said wires in segments thereof.

4. The passcard as described in claim 3 wherein the sheet of barium ferrite or other magnetizable material is secured to a rigid backing lamination.

5. The passcard as described in claim 4, wherein a further lamination is provided on the opposite side of the sheet of barium ferrite or other magnetizable material to that to which the rigid backing lamination is secured, thereby to sandwich said sheet between said laminations.

6. A device for use with means responsive to a particular magnetic flux pattern to produce a signal pattern, said device comprising:
   (a) a carrier member comprised at least in part of a magnetizable material; and
   (b) a plurality of bi-stable magnetic wires, said wires being magnetized in a first polar direction, and disposed in a predetermined pattern in fixed association with said magnetizable material, and said magnetizable material being magnetized in a different polar direction from that of the wire, at a plurality of preselected areas adjacent said magnetized wires, to at least partially overcome the effect of the magnetization of said wires in said first polar direction.

7. The method of fabricating a passcard comprising:
   (a) providing a relatively rigid backing lamination and a carrier sheet secured thereto, said carrier sheet having a plurality of bi-stable magnetic wires disposed thereon in a predetermined pattern, and at least a part of said carrier sheet being of barium ferrite or other similarly magnetizable material extending over an area adjacent at least some of said wires; and
   (b) subjecting said magnetizable material at at least one preselected location in said area adjacent at least one of said wires, to a magnetic force to magnetize the barium ferrite in said preselected location.

8. The method of fabricating a passcard comprising:
   (a) providing a carrier sheet, said carrier sheet having a plurality of bi-stable magnetic wires disposed thereon in a predetermined pattern, and at least a part of said carrier sheet being of barium ferrite or other similarly magnetizable material extending over an area adjacent at least some of said wires; and
   (b) subjecting said magnetizable material at at least one preselected location in said area adjacent at least one of said wires, to a magnetic force to magnetize said magnetizable material in said preselected location.

9. A passcard readable in a magnetic reader to produce a predetermined output signal pattern comprising:
   a plurality of bi-stable magnetic wires disposed thereon in a predetermined pattern;
   said passcard being comprised at least in part of a magnetizable material;
   said magnetizable material being magnetizable at one or more areas adjacent said magnetic wires to inhibit the reading of selected ones of said magnetizable wires by said magnetic reader.

10. The passcard of claim 9 wherein said passcard comprises a sheet of said magnetizable material, said magnetic wires being secured to said sheet in said predetermined pattern.

11. The passcard of claim 9 or claim 10 wherein said magnetizable material is barium ferrite.

12. The passcard as described in claim 9 or claim 10 wherein the magnetizable material is secured to a rigid backing lamination.

13. The passcard as described in claim 12 wherein a further lamination is provided on the opposite side of the magnetizable material to that to which the rigid backing lamination is secured, thereby to sandwich said wires and said magnetizable material between said laminations.

14. A device for use with magnetic reader means to produce an output signal sequence, said device comprising:
   (a) a carrier member comprised at least in part of a magnetizable material; and
   (b) a plurality of bi-stable magnetizable wires being disposed in a predetermined pattern in fixed association with said magnetizable material, and said magnetizable material being magnetizable at a plurality of preselected areas adjacent said magnetizable wires for inhibiting response of said magnetic reader means to selected ones of said wires, to thereby produce a particular output signal sequence.

15. A passcard having at least one bi-stable magnetic wire disposed thereon in a predetermined pattern, for insertion in a magnetic reader to produce a predetermined output signal pattern, said passcard being comprised at least in part of a magnetizable material, said bi-stable magnetic wire being disposed in a predetermined pattern in proximity to said magnetizable material; and
   said magnetizable material being magnetized at preselected areas adjacent said at least one bi-stable magnetic wire to inhibit the reading of selected ones of said wires by said magnetic reader.

16. The passcard as described in claim 15 wherein said magnetizable material is a sheet of barium ferrite.

17. A programmable data storage device comprising:
   a body of permanently magnetizable material; and
   at least one bi-stable magnetic wire disposed in proximity to said magnetizable material such that a portion of said magnetizable material may be selectively magnetized to inhibit the state reversal of said bi-stable magnetic wire by an external magnetic field, or may be substantially demagnetized to permit such state reversal of said bi-stable magnetic wire.

18. The device of claim 17 further comprising carrier means for maintaining said means of magnetizable material and said at least one bi-stable magnetic wire in fixed relationship to each other.

19. The device of claim 17 or claim 18 wherein said permanently magnetizable material is barium ferrite.

20. An interactive cardkey system comprising:
carrier means having a plurality of bi-stable magnetic wires disposed thereon in a predetermined pattern and comprising body means of permanently magnetizable material in proximity to said bi-stable magnetic wires;
magnetic reader means for deriving a pulse output by causing state reversal of said bi-stable magnetic wires;
one or more of said plurality of wires defining a code readable by said magnetic reader means; and
means provided in said magnetic reader means for selectively magnetizing or demagnetizing preselected areas of said body means of magnetizable material to inhibit or enable respectively state reversal of at least one of said magnetic wires by said magnetic reader, whereby coded data may be programmed and stored on said carrier means by said magnetic reader means.

21. The interactive system of claim 20 wherein said carrier means are incorporated in a card structure.

22. A magnetic read head for deriving a pulse output sequence responsive to passcards of the type having at least one bi-stable magnetic wire affixed in proximity to a body of permanently magnetizable material provided in said passcards, said magnetic read head also comprising, in combination:
first means for inducing temporary magnetic reversal of said least one bi-stable magnetic wire; and
second means for selectively altering the magnetic state of particular portions of said permanently magnetizable material associated with particular ones of said bi-stable magnetic wires to thereby alter the pulse output sequence obtainable from a particular card.

23. The magnetic read head of claim 22 further comprising data processor means receiving said pulse output sequence as an input and connected for controlling said second means in response to said pulse output sequence.

* * * * *